United States Patent
Takeo (10) Patent No.: US 7,031,120 B2
(45) Date of Patent: Apr. 18, 2006

(54) DISK DRIVE WITH MAGNETIC HEAD FOR PERPENDICULAR MAGNETIC RECORDING

(75) Inventor: Akihiko Takeo, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 10/629,915

(22) Filed: Jul. 30, 2003

(65) Prior Publication Data

US 2004/0075952 A1    Apr. 22, 2004

(30) Foreign Application Priority Data

Jul. 31, 2002    (JP)    ............... 2002-223523

(51) Int. Cl.
 *G11B 5/127* (2006.01)
 *G11B 5/39* (2006.01)
 *G11B 5/48* (2006.01)

(52) U.S. Cl. .................................... 360/313

(58) Field of Classification Search ................ 360/313, 360/319, 317, 324, 326, 125, 135, 131, 110
See application file for complete search history.

(56) References Cited

U.S. PATENT DOCUMENTS 6,618,227 B1 * 9/2003 Yano et al. ................. 360/317
6,636,390 B1 * 10/2003 Funayama et al. .......... 360/317
2002/0089796 A1 * 7/2002 Tanaka ....................... 360/324

FOREIGN PATENT DOCUMENTS

| JP | 10-222836 A | 8/1998 |
| JP | 2000-011303 A | 1/2000 |
| JP | 2000-90424 | 3/2000 |
| JP | 2000-090424 A | 3/2000 |
| JP | 2001-101651 A | 4/2001 |

OTHER PUBLICATIONS

Japanese Office Action dated Feb. 8, 2005 for Appln. No. 2002-223523.

* cited by examiner

*Primary Examiner*—Julie Anne Watko
(74) *Attorney, Agent, or Firm*—Pillsbury Winthrop Shaw Pittman LLP (57) ABSTRACT

A disk drive of a perpendicular magnetic recording system uses a double-layered disk medium including a soft magnetic layer. This disk drive is configured to suppress any adverse effect on a read head element under a magnetic field of a magnetic disturbance applied in a perpendicular direction, which might be caused to occur by being accentuated by a soft magnetic layer.

4 Claims, 6 Drawing Sheets

DISK DRIVE WITH MAGNETIC HEAD FOR PERPENDICULAR MAGNETIC RECORDING

CROSS-REFERENCE TO RELATED APPLICATIONS

This application is based upon and claims the benefit of priority from the prior Japanese Patent Application No. 2002-223523, filed Jul. 31, 2002, the entire contents of which are incorporated herein by reference.

BACKGROUND OF THE INVENTION

1. Field of the Invention

The present invention relates generally to the field of disk drives, and more particularly, to a disk drive of a perpendicular magnetic recording system that uses a double-layered disk medium for suppressing adverse effects caused by magnetic disturbances.

2. Description of the Related Art

In recent years, in the field of magnetic disk drives, attention has been paid to a perpendicular magnetic recording system, in which a magnetized area, corresponding to recorded data, is formed in a perpendicular (thickness) direction of the disk medium (hereinafter, simply referred to as "a disk").

For the disk drive of a perpendicular magnetic recording system, use is normally made of a double-layered disk having a magnetic recording layer capable of perpendicular magnetic recording, and a soft magnetic layer provided between the magnetic recording layer and a substrate.

Further, the disk drive uses a magnetic head provided, on a slider of a head body, with separate read and write heads. The write head element is comprised of, for example, a single pole type head element suitable for a perpendicular magnetic recording system. The read head element is comprised of, for example, a spin-valve MR (magnetoresistive) element or a GMR (giant MR) element such as a TMR (tunneling MR) element. The GMR element is comprised of a magnetoresistive-type magnetism-detection element.

In the disk drive of a perpendicular magnetic recording system, the recording magnetic flux applied from the write head element to the disk is also received by the soft magnetic layer to allow effective magnetic recording.

Here, in a perpendicular magnetic recording type disk drive, the soft magnetic layer is used to improve the magnetic recording efficiency also highly sensitive to magnetic disturbances, which is a problem. Magnetic disturbances are external magnetic fields generated, from a spindle motor (SPM) in the drive, and a voice coil motor (VCM) of an actuator. The SPM is a motor configured to rotate the disk. The actuator has a mounted magnetic head (slider) and is comprised of a mechanism configured to move a read/write head to a target position on the disk.

Such magnetic disturbance makes the recording magnetization of the disk unstable and also exerts an adverse effect on the GMR element of the read head. It has been confirmed that, if, in particular, a magnetic field from the magnetic disturbance is emphasized by the soft magnetic layer and applied to the read head element (GMR element), then a read signal waveform which is outputted from the read head element suffers a distortion, etc., to cause the read error rate to be deteriorated.

As the prior art technique, a technique has been proposed for suppressing any adverse effect from an external magnetic field applied in a longitudinal direction of the disk (See, the example, JP PAT APPLN KOKAI PUBLICATION NO. 2000-90424).

In this prior art, the permeability of the soft magnetic layer is made relatively small and, by doing so, the reactivity of the magnetization of the soft magnetic layer under the external magnetic field is reduced, to suppress the magnetic flux of the magnetic disturbance from being concentrated onto the magnetic head.

In the prior art technique, it is possible to suppress any adverse effect from the external magnetic field applied in the longitudinal direction of the disk, but it is not necessarily effective for a magnetic field of a magnetic disturbance applied in a direction perpendicular to the disk.

BRIEF SUMMARY OF THE INVENTION

In accordance with one embodiment of the present invention, there is provided a disk drive using a double-layered disk medium including a soft magnetic layer between a magnetic recording layer and a substrate in which a resultant structure suppresses a magnetic field strength adversely exerted on a read head element from being applied under an external magnetic field, such as a magnetic disturbance, in a perpendicular direction (in a thickness direction of the disk).

The disk drive for perpendicular magnetic recording, comprises a disk medium having a soft magnetic layer provided between a magnetic recording layer for recording data and a substrate; and a magnetic head having a read head element and shield member over the disk medium, the read head element being configured to detect a recording magnetic field from the magnetic recording layer and the shielding member being configured to shield the read head element, in which a resultant structure suppresses a field magnetic strength which adversely affects the read head element from being applied under a magnetic disturbance in a direction of a thickness of the disk medium.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiment of the present invention will be described below with reference to the accompanying drawing.

(Structure of a Disk Drive)

Figure 1:
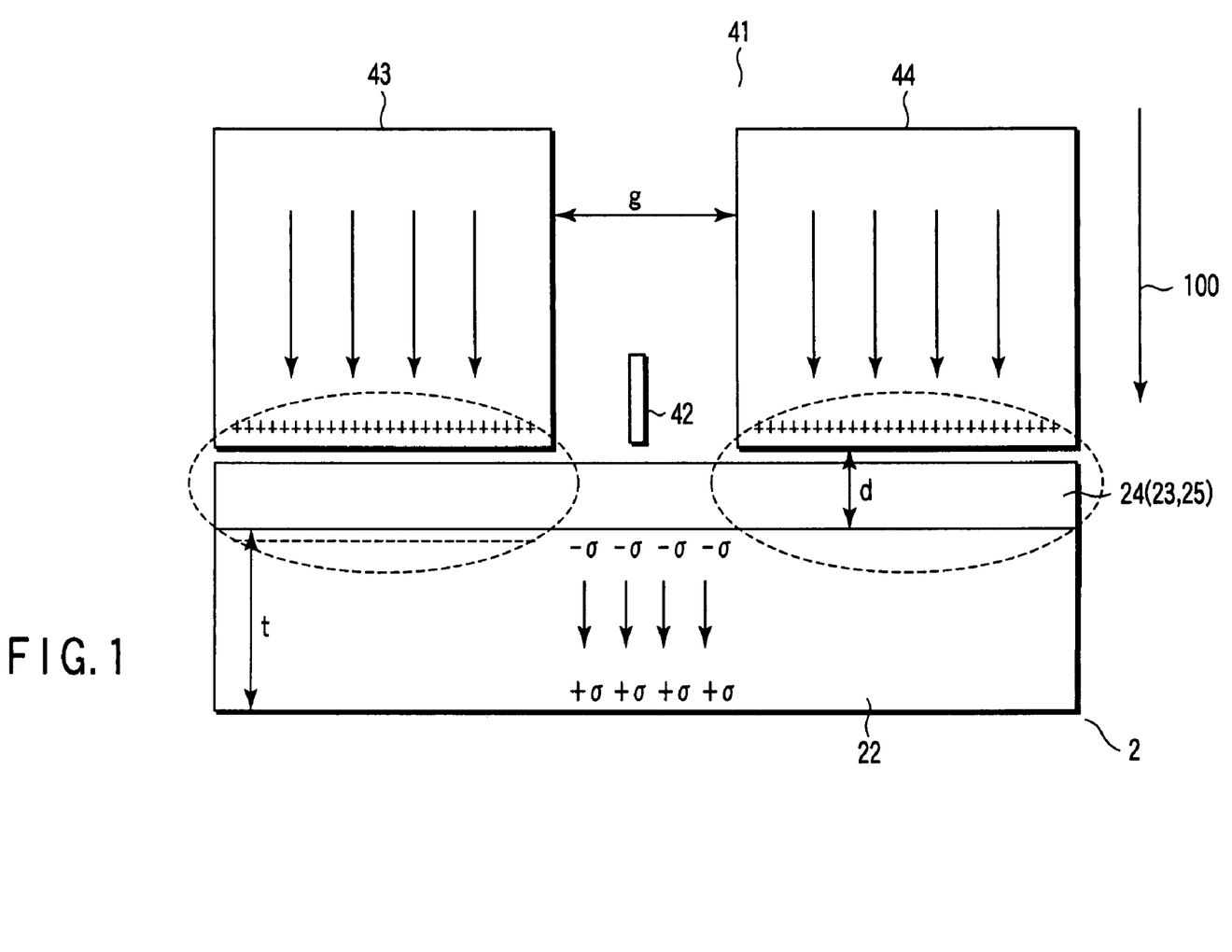
FIG. 1 is a conceptual view showing a structure of the disk and head relating to the embodiment of the present invention.
Figure 2:
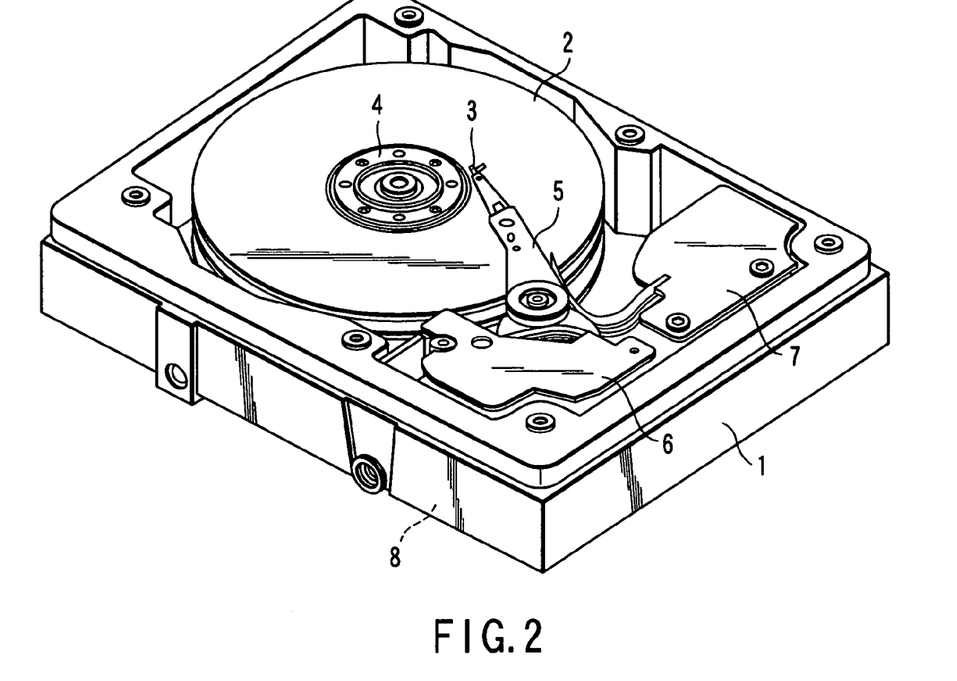
FIG. 2 is a view showing an outer appearance of a disk drive relating to an embodiment of the present invention.
Figure 3:
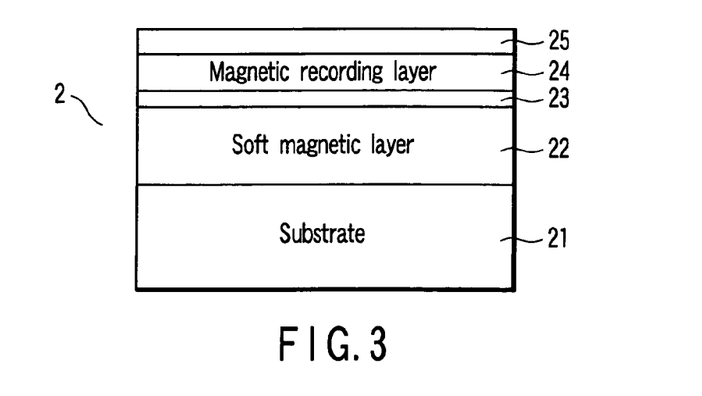
FIG. 3 is a view showing a structure of a disk medium relating to the embodiment of the present invention.

FIG. 1 is a conceptual view of a structure relating to the present embodiment, FIG. 2 is an external view showing a disk drive relating to the present embodiment, and FIG. 3 is a view showing a structure of a disk of the disk drive.

The present disk drive is comprised of a drive of a perpendicular magnetic recording system. As shown in FIG. 2, the present disk drive has, in a casing, a disk 2 comprised of a magnetic recording medium and a magnetic head (hereinafter referred to simply a head) 3 configured to read and write data from and to the disk 2.

The disk 2 is mounted on a spindle motor (SPM) 4 and is rotatable. The head 3 is mounted on a forward end portion (suspension) of an actuator 5. The actuator 5 is comprised of a mechanism including a voice coil motor 6 and configured to move the head 3 in a radial direction over the disk 2 and set it to a target position.

Further, the present drive has a head IC 7 connected to the head 3 and configured to control the input and output of a read/write signal and a circuit substrate 8 provided on a rear side of the casing 1.

The disk 2 is comprised of a double-layered disk of a perpendicular magnetic recording system and, as shown in FIG. 3, has a substrate 21, a soft magnetic layer 22, an alignment control layer 23, a magnetic recording layer 24 and a protective film (including a lubricating material) 25.

The substrate 21 includes glass or aluminum material. The soft magnetic layer 22 is formed, for example, of a 0.1 μm-thick stacked layer having a Co—Zr—Nb as a principal component. The alignment control layer 23 is formed of, for example, an about 5 nm-thick Ru layer as a principal component. The magnetic recording layer 24 is formed, for example, of a 15 nm-thick stacked layer of a magnetic material having a Co—Pt as a principal component. And a protective film 25 is formed, for example, of a 2 nm-thick layer carbon material.

Figure 4:
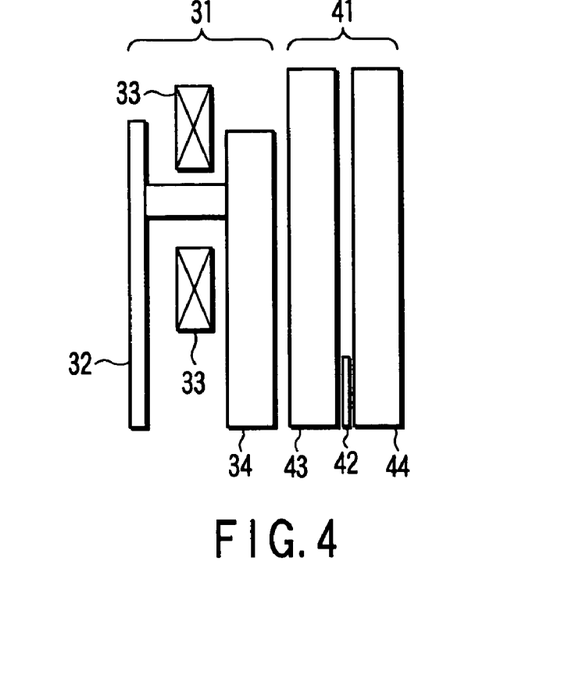
FIG. 4 is a view showing a structure of a magnetic head relating to the present invention.

FIG. 4 is a view showing a structure of the head 3.

The head 3 has a structure having a write head element 31 and read head element 41 (the read head element is formed of a GMR element 42), in a separate form, on a head body called a slider, as shown in FIG. 4.

The write head element 31 includes a main magnetic pole 32, a return yoke 34 and a coil 33 and generates a perpendicular recording magnetic field relative to the disk 2. The main magnetic pole 32 is of such a type that a magnetic material (Fe—Co—N) having a saturation magnetic flux density Bs of, for example, about 2.2 teslas is formed as having a film thickness of, for example, 0.2 μm in a way to correspond to a recording track width (for example, 0.2 μm) on the disk 2.

The read head element 41 has a magnetoresistive type magnetism-detection element (GMR element 42) and first and second shielding members 43 and 44 configured to shield the GMR element 42.

The GMR element 42 is comprised of, for example, a spin valve MR element or TMR element and formed in a form sandwiched with the shielding members 43 and 44. The GMR element 42 has a playback track width of about 0.12 μm relative to a recording track (track width 0.2 μm) on the disk 2.

The shielding materials 43, 44 are Permalloy having, for example, a saturation magnetic flux density Bs of about 1.2 teslas and film thickness of 1 μm.

(Characterizing Structure and Functional Advantage of the Embodiment)

For the fundamental structure of the disk drive as set out above, an explanation will be made in connection with the characterizing structure of the embodiment and its functional advantage.

FIG. 1 is a conceptual view showing a structure of the disk 2 and read head element 41 which are incorporated in the present disk drive.

FIG. 1 shows a state in which the head 3 (read head element 41) mounted on the actuator 5 is floated over the disk 2. In this state, it is assumed that a magnetic disturbance 100 is applied in a perpendicular direction (a thickness direction of the disk 2).

In the read head element 41, the distance g between the shielding members 43 and 44 is about 70 nm and an amount of floating of the head 3 (the distance between the surface of the disk 2 and the forward end of the head 3) is about 10 nm. Here, the forward end of the head 3 includes the forward ends of the shielding members 43, 44 opposite to the surface of the disk 2.

For the disk 2, the recording layer 24 is about 15 nm thick and the protective layer 25 is about 2 nm thick. Further, the alignment control layer 23 is about 15 nm thick. The spacing (distance) d from the surface of the soft magnetic layer 22 to the read head element 41 is about 47 nm (47=15+15+2+10+5). It is to be noted that, for the read head element 41, an amount of recess including a head protective film is set to be about 5 nm.

For the case of the soft magnetic layer 22, it is supposed that, with "μ" given as the permeability involving no "shape diamagnetism", the permeability μ is given as about 80 and the thickness "t" is given as about 50 nm.

The characterizing structure of the present embodiment satisfies the following relation (1)

$$tg(\mu - 4\pi(1-\exp(-\pi t/g))) < 2\pi d(d+t) \qquad (1)$$

among those parameters of the shielding distance g, spacing d, and permeability μ and thickness t of the soft magnetic layer 22.

When a perpendicular magnetic disturbance 100 is applied to a structure satisfying such a relation (1), then it is possible to suppress a magnetic field strength Hz (Hz<Ha), given that "Ha" denotes a magnetic strength and "Hz" denotes the magnetic field strength under which an adverse effect enhanced by the soft magnetic layer 22 is exerted over the read head element (GMR element 42).

Now the functional merit of the present embodiment will be described below by referring to not only FIG. 1 but also FIGS. 5 to 10.

Figure 5:
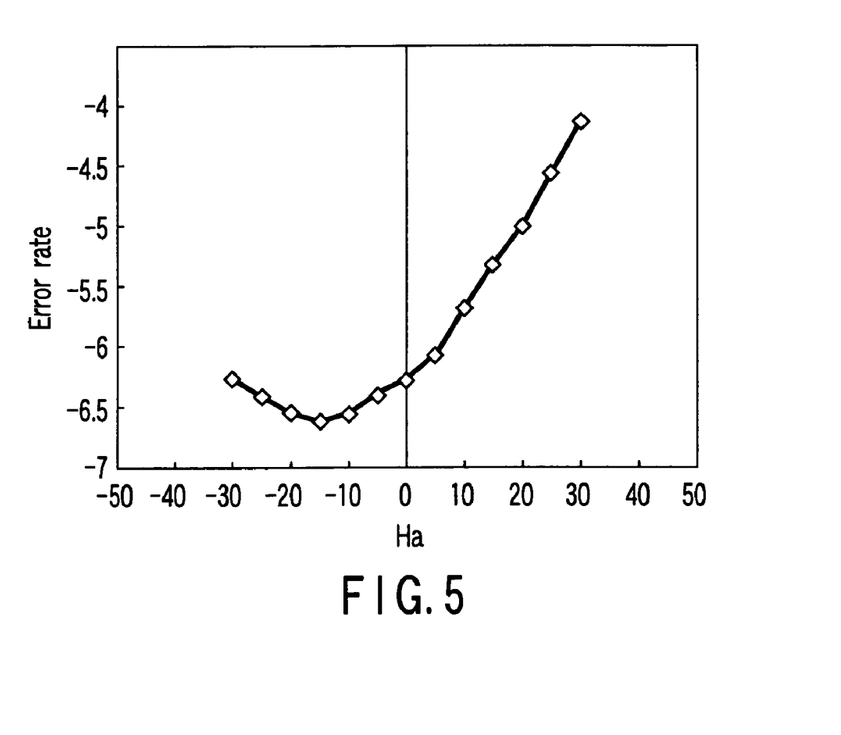
FIG. 5 is a view showing a result of measurement of a read error rate on the disk drive of the present invention.

FIG. 5 shows a result of a measured read error rate relative to the strength Ha of the external magnetic field when a perpendicular magnetic disturbance is applied to a disk drive of a perpendicular magnetic recording system not adopting the structure of the present embodiment. Stated in more detail, this means the data bit error rate caused by the magnetic field strength of the magnetic disturbance at a read operation time of reading out the data from the disk 2 by the read head element.

Figure 6:
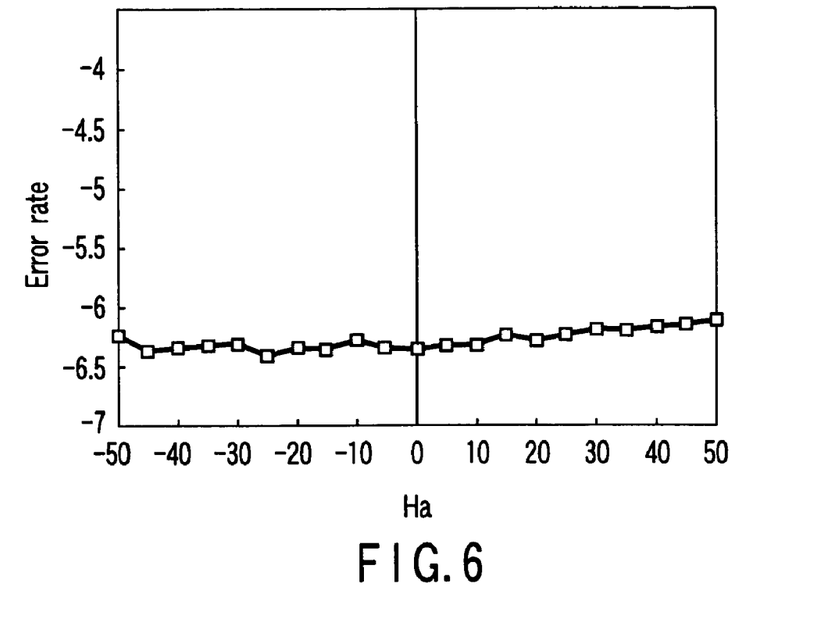
FIG. 6 is a view showing a result of measurement of a read error rate on a disk drive of a longitudinal magnetic recording system which is made to explain the advantage of the present embodiment.

FIG. 6 is a view showing a result of a measured read error rate relative to the strength Ha of an external magnetic field when a perpendicular magnetic disturbance is applied to a disk drive of a longitudinal magnetic recording system.

As evident from FIGS. 5 and 6, it can be confirmed that, in the disk drive of the perpendicular magnetic recording system, a greater characteristic variation of the bit error rate at the read operation time occurs, in general, due to an effect under the external magnetic field, thus the data reliability becomes unstable.

Further, when an applied magnetic field strength exceeds a given value F (for example, $40\times-/(4)\times10^3$ A/m) for the perpendicular magnetic recording system, there is no recovery back to a previous bit error rate even if the magnetic field is removed. It is presumed that this is caused to occur by a distortion of a magnetized pattern recorded on the disk 2 due to magnetic disturbance.

In the case where, on the other hand, an external magnetic field below the given value F is applied, a bit error rate variation is reversible. That is, a deteriorated bit error rate is recovered back to a previous read error rate characteristic after the external magnetic field has been removed.

Figure 7:
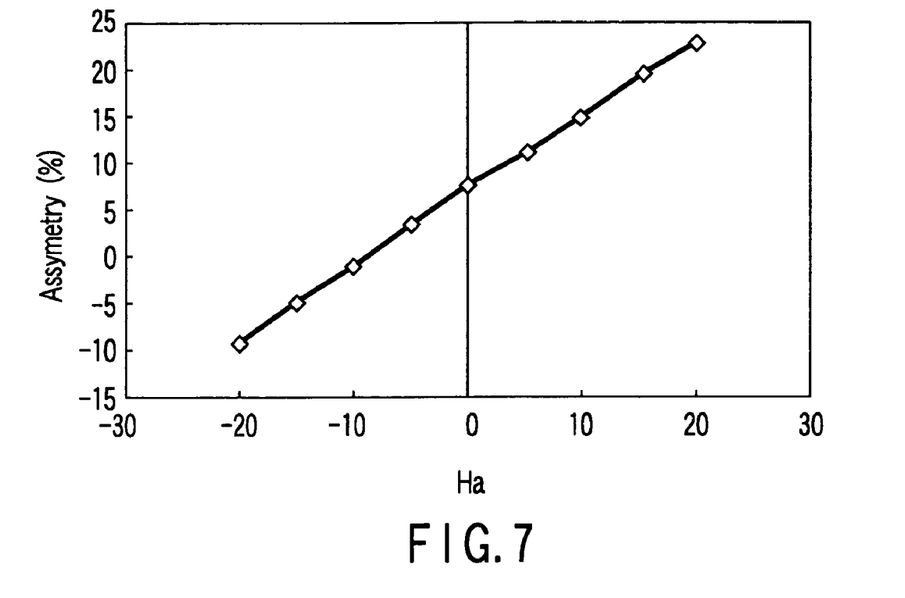
FIG. 7 is a view showing a relation of a magnetic disturbance and top/bottom asymmetry of a read signal waveform relating to the present invention.

FIG. 7 shows a variation of a top/down asymmetry of a read signal waveform outputted from the read head element 41 relative to a strength Ha of an external magnetic field. As evident from FIG. 7, it can be presumed that the magnetic field strength of the magnetic disturbance is applied as a bias magnetic field to the GMR element 42 of the read head element to emphasize the asymmetry of a read signal waveform from the GMR element. In the case where there occurs a greater top/down asymmetry of the read signal waveform, this acts as a cause for lowering a bit error rate at the read operation time.

Figure 8:
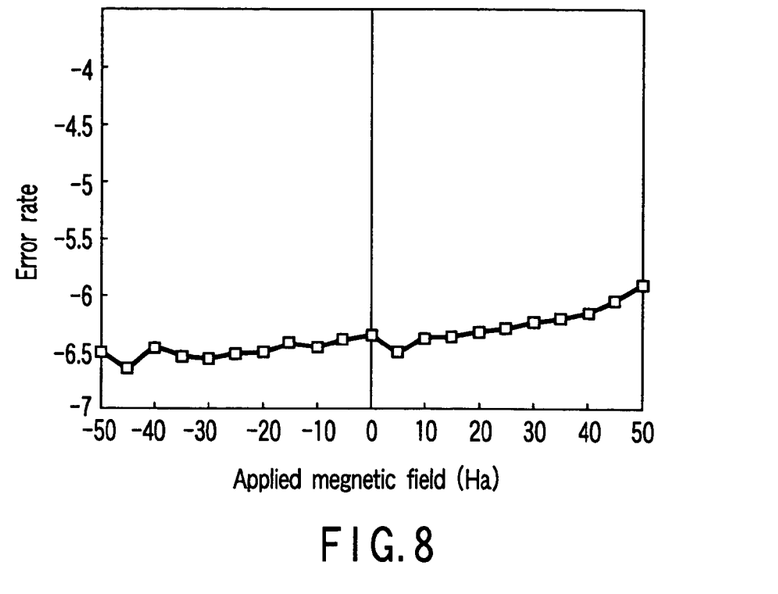
FIG. 8 is a view showing a read error rate characteristic relating to the present embodiment.

FIG. 8 is a view showing a result of a measured read error rate relative to the strength Ha of an applied magnetic field in the case where a perpendicular magnetic disturbance is applied to the disk drive of a structure where parameters are set to satisfy the condition of the relation (1).

As evident from FIG. 8, it is seen that an effect of the characteristic variation due to the applied magnetic field of the magnetic disturbance is greatly suppressed to reveal the stability of a read error rate. That is, it is presumed that, according to the structure of the present invention, it is possible to suppress a magnetic strength under which the magnetic disturbance exerts an adverse effect on the read head element.

Figure 9:
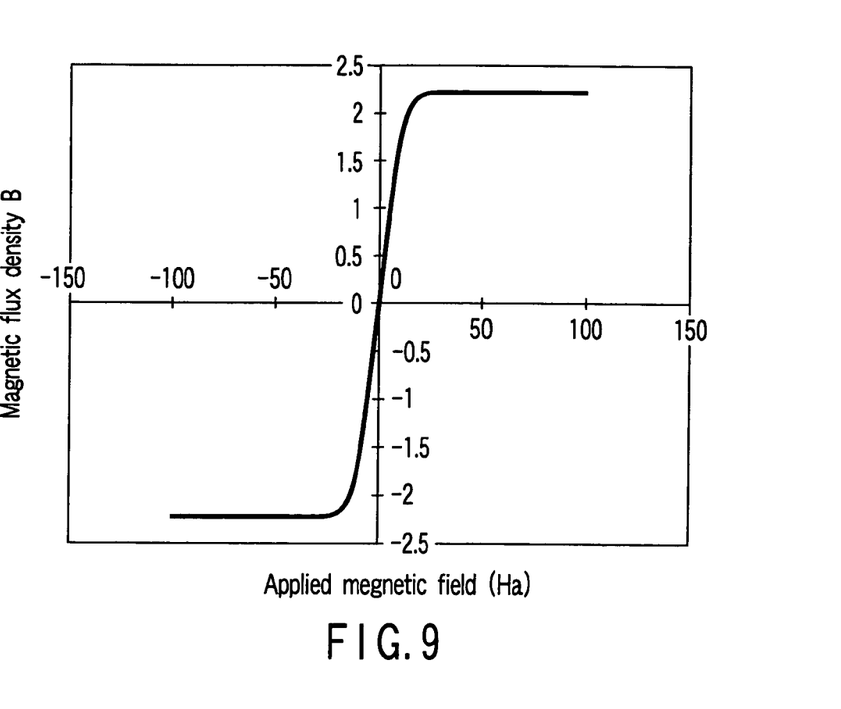
FIGS. 9 and 10 are views showing a magnetic characteristic of a soft magnetic layer relating to the present invention.
Figure 10:
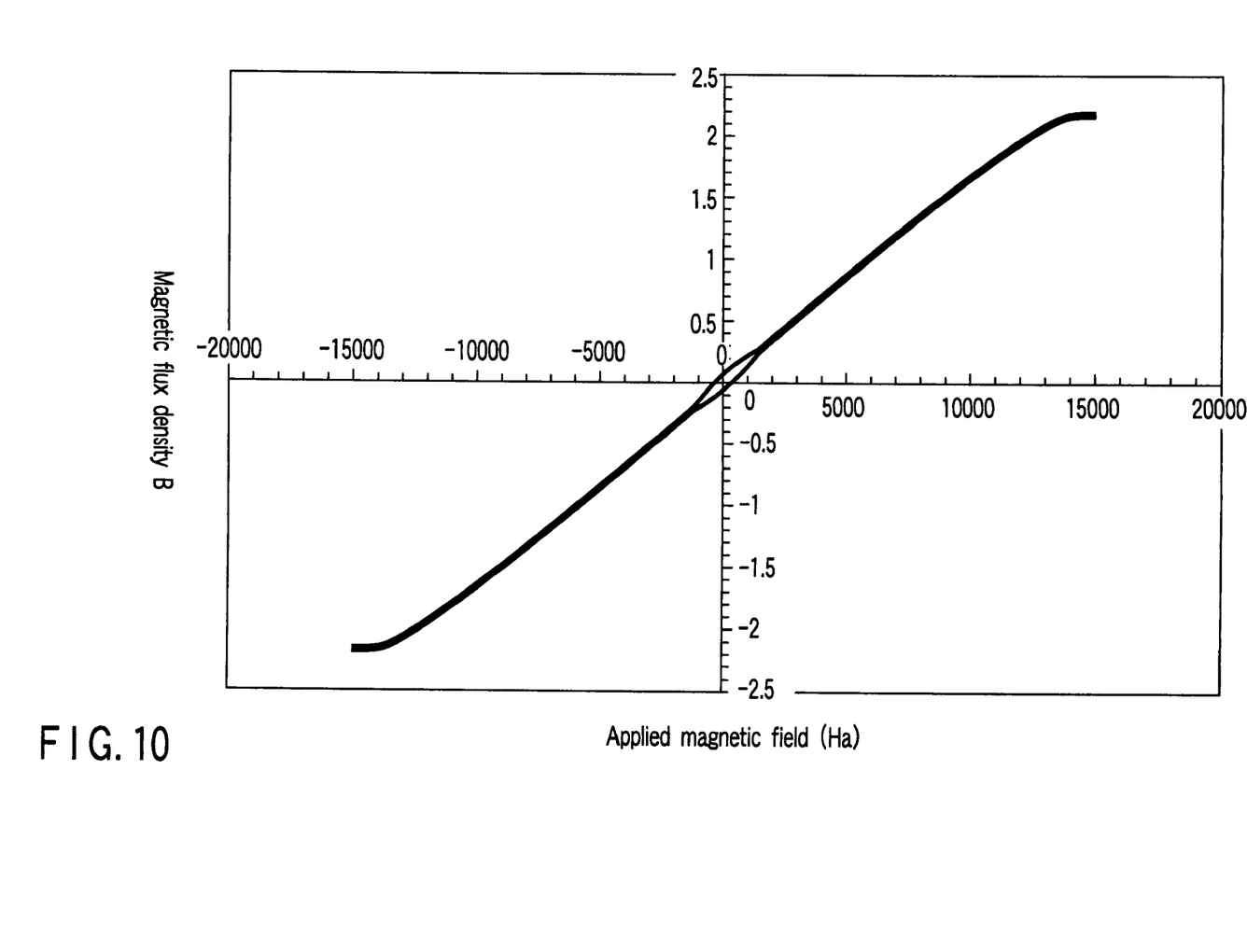

FIGS. 9 and 10 shows the magnetic characteristic of the soft magnetic layer 22 of the disk in a way to be separated into a direction component parallel to a film surface and a direction component normal (perpendicular) to the film surface.

The soft magnetic layer 22, if being a thinner film, reveals almost no shape anisotropy in the direction parallel to the film surface. For this reason, the magnetic flux density B reveals the characteristic such that it suddenly rises even under a slight application magnetic field (strength Ha) and soon reaches a saturation magnetic flux density.

In the case where, on the other hand, the application magnetic field is perpendicular to the soft magnetic layer 22, the soft magnetic layer 22 generates a "shape diamagnetism" resulting from a surface magnetic charge (σ in FIG. 1) appearing on the thin film surface under its own magnetization and acts in a direction to cancel an adverse effect exerted under the external magnetic field. For this reason, a rise in the magnetic flux density is deadened to reveal magnetic characteristic (hysteresis curve) as shown in FIG. 10. At this time, if the magnetic flux density is heightened in the interior of the soft magnetic layer 22, the magnetic field strength in its near surface portion is increased by that extent.

In the case where a magnetic field of a magnetic disturbance is applied to the disk drive, the effect of the magnetic field strength is emphasized by the soft magnetic layer 22. It is, therefore, necessary to suppress the adverse effect exerted under the application magnetic field strength from the soft magnetic layer 22.

Even if, in FIG. 10, the magnetic flux density B of the soft magnetic layer 22 is increased within an application magnetic field range of the disturbance, it is only necessary to suppress the near-surface magnetic field strength (σ in FIG. 1). In general, if the permeability μ (μ=the variation of the magnetic flux density/variation of the application magnetic field) of the perpendicular direction of the soft magnetic layer 22 (the direction normal to that film surface) is below 1 relative to the magnetic field applied in the perpendicular direction, it is possible to suppress an increase in surface magnetic field strength.

Since, however, the thickness "t" of the soft magnetic layer requires a capacity great enough to allow a recording characteristic, that is, allow the recording magnetic flux (total magnetic flux amount) to be received from the write head element, there is a limit to the thinning of the layer. It is, therefore, difficult to set the permeability to be below 1.

In the case where the magnetic disturbance 100 is applied as shown in FIG. 1, a magnetic flux readily flows in the respective shielding members 43, 44 of the read head element 41. On the other hand, the magnetic charge appearing on the surface of the soft magnetic layer 22 emerges in a way to cancel the magnetic charge appearing on the surface of the shielding members 43, 44. For this reason, a diamagnetic field resulting from the surface magnetic charge (σ) does not effectively appear on the surface of the soft magnetic layer 22.

In general, the film thickness of the respective shielding member (43, 44) is about 1 μm and, being compared with the shielding gap g, is adequately thick. In the case where the magnetic field applied from the surface of the soft magnetic layer 22 is assumed relative to the GMR element 42 present in the shielding gap, it is possible to almost disregard an effect more from an external side than at the opposite surfaces of the respective shielding members 43, 44.

It is also supposed that the thickness of the respective shielding members 43, 44 in a track width direction (in the direction orthogonal to the disturbance 100) is set to be about a few tens μm. Here, when the magnetization Mz of the soft magnetic layer 22 is aligned to the perpendicular direction, the strength Hd of the diamagnetic field induced in the interior of the soft magnetic layer 22 is given by the following equation (2)

$$Hd=4\pi Mz(1-\exp(-\pi t/g))) \tag{2}$$

Here, the track width of the respective shielding members 43, 44 is set to an adequately greater value (>>tg).

With μ denoting the permeability at a time involving no effect from the diamagnetic field of the soft magnetic layer 22, it follows from the equation (2) and magnetic field strength Ha of the magnetic disturbance that the magnetic charge σ appearing on the surface of the soft magnetic layer 22 is given by $$\sigma=(\mu-4\pi(1-\exp(-\pi t/g)))Ha \tag{3}$$

Further, the magnetic charge σ on the surface of the soft magnetic layer 22 is such that, with Hz denoting a magnetic field strength applied to the read head element 41, this magnetic field strength is given by $$Hz = \sigma g/2\pi d - \sigma g/2\pi(d+t) \quad (4)$$

In order to avoid the effect from the external magnetic field (the application magnetic field of the magnetic disturbance 100) from being emphasized by the soft magnetic layer 22, it is only necessary that the following relation (5) be established.

$$Hz < Ha \quad (5)$$

From this relation (5), the previous relation (1) can be derived.

In short, as set out above, in the disk drive using a double-layered disk, the soft magnetic layer emphasizes the external magnetic field (magnetic disturbance) applied in the perpendicular direction. If, therefore, the thickness "t" of the soft magnetic layer is made relatively thin, the gap distance "g" between the shielding members is made relatively small and the spacing distance "d" is made greater, then it is possible to suppress the magnetic strength of the magnetic disturbance affecting the read head element.

Since, on the other hand, the thickness "t" of the soft magnetic layer requires a capacity great enough to allow the recording characteristic, that is, allow the recording magnetic flux (total magnetic flux amount) to be received from the write head element, there is a limit to the thinning of the layer. It is thus difficult, from the standpoint of manufacture, to decrease the gap distance g between the shielding members. Further, an increase in the spacing distance "d" lowers the output level of the read head element.

If, therefore, it is possible to obtain a structure satisfying the condition of the relation (1), then it is possible to suppress an adverse effect on the read head element which might be caused to occur due to the emphasis of the magnetic field strength of the magnetic disturbance. Even for the disk drive using the disk 2 including the soft magnetic layer 22 sharply sensitive to the magnetic disturbance it is possible to achieve a stabilized read error rate and hence to reproduce data with high reliability.

Although the present embodiment is applied to a disk drive of the perpendicular magnetic recording system, it can be effectively applied to a disk drive having a structure including a soft magnetic layer in a disk medium and configured to use a shielding type read head.

According to the present embodiment, as set out above, for a disk drive using a disk having a soft magnetic layer, it is possible to suppress any adverse effect on a read head element which might be caused to occur under an application magnetic field of a perpendicular magnetic disturbance. It is, therefore, possible to achieve an improved read error rate and to secure high reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
   a disk medium having a substrate, a magnetic recording layer and a soft magnetic layer interposed between the substrate and the magnetic recording layer; and
   a magnetic head having a read head element for detecting a magnetic field from the magnetic recording layer and shielding members to shield the read head element,
   wherein parameters are set for the disk medium and the magnetic head to satisfy a relation $tg(\mu-\pi 4(1-\exp(-\pi t/g))) < 2\pi d(d+t)$ where t: the thickness of the soft magnetic layer;
   μ: the permeability of a direction perpendicular to the surface of the soft magnetic layer when an influence of a diamagnetic field is removed;
   g: a distance from one of the shielding members to another one of the shielding members with the read head element disposed between said one and said another one of the shielding members; and
   d: a spacing distance from the surface of the soft magnetic layer to a proximal end of the magnetic head.

2. The disk drive according to claim 1, wherein the magnetic head includes a write head element to allow a perpendicular magnetic recording operation to be performed on the disk medium and further comprising a system for a perpendicular magnetic recording.

3. The disk drive according to claim 1, wherein the read head element includes a magnetoresistive element arranged between the shielding members and wherein the magnetic head includes a write head element to allow a perpendicular magnetic recording operation to be performed on the disk medium, the write head element being separate from the read head element.

4. The disk drive according to claim 1, wherein the read head element includes a magnetism-detection element including a giant magnetoresistive element.

* * * * *